(12) United States Patent
Potter

(10) Patent No.: US 10,495,069 B2
(45) Date of Patent: Dec. 3, 2019

(54) STABILIZING A WIND TURBINE ASSEMBLY

(71) Applicant: Noel Richard Potter, Bountiful, UT (US)

(72) Inventor: Noel Richard Potter, Bountiful, UT (US)

(*) Notice: Subject to any disclaimer, the term of this patent is extended or adjusted under 35 U.S.C. 154(b) by 223 days.

(21) Appl. No.: 15/004,755

(22) Filed: Jan. 22, 2016

(65) Prior Publication Data

US 2017/0211549 A1 Jul. 27, 2017

(51) Int. Cl.
| | | |
|---|---|---|
| *F03D 80/70* | (2016.01) | |
| *F03D 3/00* | (2006.01) | |
| *F16C 19/10* | (2006.01) | |
| *F16C 19/30* | (2006.01) | |
| *F03D 9/25* | (2016.01) | |

(52) U.S. Cl.
CPC ............ *F03D 80/70* (2016.05); *F03D 3/005* (2013.01); *F03D 9/25* (2016.05); *F16C 19/10* (2013.01); *F16C 19/30* (2013.01); *F05B 2240/211* (2013.01); *F05B 2240/50* (2013.01); *F16C 2360/31* (2013.01)

(58) Field of Classification Search
CPC ........ F03D 80/70; F03D 3/005; F03D 3/0676; F03D 9/002; F03D 9/25; F03D 3/065; F16C 19/10; F16C 19/30; F16C 2360/31; F05B 2240/211; F05B 2240/50; Y02E 10/74
USPC .... 416/174, 23, 24, 132 B, 196 A, 176, 177, 416/223 R, DIG. 9; 415/4.2, 4.4, 71; 290/44
See application file for complete search history.

(56) References Cited

U.S. PATENT DOCUMENTS

| | | | | |
|---|---|---|---|---|
| 4,422,825 A | * | 12/1983 | Boswell | .................... F03D 3/06 416/119 |
| 6,629,815 B2 | * | 10/2003 | Lusk | ...................... F03D 3/005 415/4.2 |
| 8,967,969 B2 | * | 3/2015 | Boston | .................... F16F 1/324 267/161 |
| 9,523,353 B2 | * | 12/2016 | Frank | ........................ F16H 1/28 |
| 9,797,372 B2 | * | 10/2017 | Iqbal | ...................... F03D 3/005 |
| 2010/0133851 A1 | * | 6/2010 | Devitt | ....................... C23C 4/04 290/55 |
| 2010/0254798 A1 | * | 10/2010 | Tutt | ...................... F03D 3/0436 415/4.2 |
| 2011/0176919 A1 | * | 7/2011 | Coffey | .................... F03D 3/005 416/124 |
| 2011/0311362 A1 | * | 12/2011 | Corts | ...................... F16C 33/60 416/174 |
| 2013/0076036 A1 | * | 3/2013 | Liu | ........................... F03D 7/00 290/44 |
| 2014/0333072 A1 | * | 11/2014 | Smith | ..................... B60L 8/006 290/55 |
| 2015/0292481 A1 | * | 10/2015 | Whinney | .................. F03D 7/06 416/17 |

\* cited by examiner

*Primary Examiner* — William V Gilbert

(57) ABSTRACT

Systems and methods for stabilizing a wind turbine assembly. In one embodiment the systems and methods include a turbine shaft to rotate a wind turbine motor, a vane support structure coupled to the turbine shaft, a vane coupled to the vane support structure by a vane shaft, and a circumferential bearing assembly positioned in relation to a rotational path of the vane around the turbine shaft.

10 Claims, 5 Drawing Sheets

STABILIZING A WIND TURBINE ASSEMBLY

TECHNICAL FIELD

The present disclosure relates generally to a wind turbine stabilizing peripheral bearing, and more particularly, to apparatuses and methods for stabilizing a wind turbine assembly.

BACKGROUND

A wind turbine assembly may include a turbine shaft configured to convert mechanical power generated by the wind turbine assembly into electrical power. A support structure may connect to one or more vane shafts. Each vane shaft may include one or more vanes. Each vane may be configured to spin freely on a vane shaft. Wind incident on a vane may cause the vane shaft to exert a force on the support structure, which force may be transferred to the turbine shaft, causing the turbine shaft to rotate. The mechanical power of the rotating turbine shaft may be converted into electrical power via a generator/alternator assembly that is part of the wind turbine assembly.

SUMMARY

According to at least one embodiment, a wind turbine oscillation reduction apparatus of a wind turbine assembly is described. In one embodiment, a turbine shaft may be configured to transmit mechanical power. A support structure may be coupled to the turbine shaft. The support structure may include one or more support arms. A peripheral stabilization bearing may be coupled to at least a portion of the support structure to significantly reduce oscillation instability.

In one embodiment, at least a portion of the stabilization bearing may connect to the bottom of the vane support arms and the bottom of the stabilization bearing may connect to the wind turbine support structure. In some embodiments, the stabilization bearing could be located underneath the vane support at some point between the turbine power transmission shaft and the vanes at the periphery of the wind turbine.

In one embodiment, the support structure may include one or more support arms radiating outward away from the turbine shaft. The stabilization bearing assembly may connect to at least one of the one or more of the plurality of support arms. The wind turbine assembly may include a vane shaft connected to at least one of the one or more support arms. The vane shaft may support one or more vanes. The vane shaft may allow the vane to rotate freely about the vane shaft.

In one embodiment, the wind turbine assembly may include a turbine shaft to rotate a wind turbine motor, a vane support structure coupled to the turbine shaft, a vane coupled to the vane support structure by a vane shaft, and a circumferential bearing assembly positioned in relation to a rotational path of the vane around the turbine shaft.

In some embodiments, the circumferential bearing assembly may include a circumferential upper race and a circumferential lower race. In some cases, the circumferential bearing assembly may include a plurality of ball bearings configured to run between the circumferential upper and lower races. The circumferential bearing assembly may include a bearing track and a wheel. The bearing track may be positioned circumferentially in relation to the rotational path of the vane. In some embodiments, the wheel may be connected to at least one of the vane shaft, the vane support structure, and the vane, the wheel comprising a plurality of ball bearings and being configured to roll under the vane and along the circumferential bearing track.

In some embodiments, the circumferential bearing assembly may include a roller plate, a roller bearing, a fixed raceway, and a revolving raceway. The roller plate and raceways may be positioned circumferentially in relation to the rotational path of the vane. In some cases, the revolving raceway may rotate on top of the roller bearing around the turbine shaft in formation with a rotation of the vane due to a wind incident on the wind turbine assembly. The revolving raceway may be connected to the vane support structure. In some cases, the fixed raceway may be connected to a plurality of support rods underneath the bearing assembly. The fixed raceway may remain fixed with the rotation of the vane due to the wind incident on the wind turbine assembly. In some embodiments, a radius from the turbine shaft to the circumferential bearing assembly is between plus and minus 25% of a radius from the turbine shaft to the rotational path of the vane around the turbine shaft.

A method for oscillation stabilization of a wind turbine assembly is also described. In one embodiment, the method may include transmitting, via a turbine shaft, mechanical power to a wind turbine motor, coupling a vane support structure to the turbine shaft, coupling a vane to the vane support structure by a vane shaft, and positioning a circumferential bearing assembly in relation to a rotational path of the vane around the turbine shaft.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
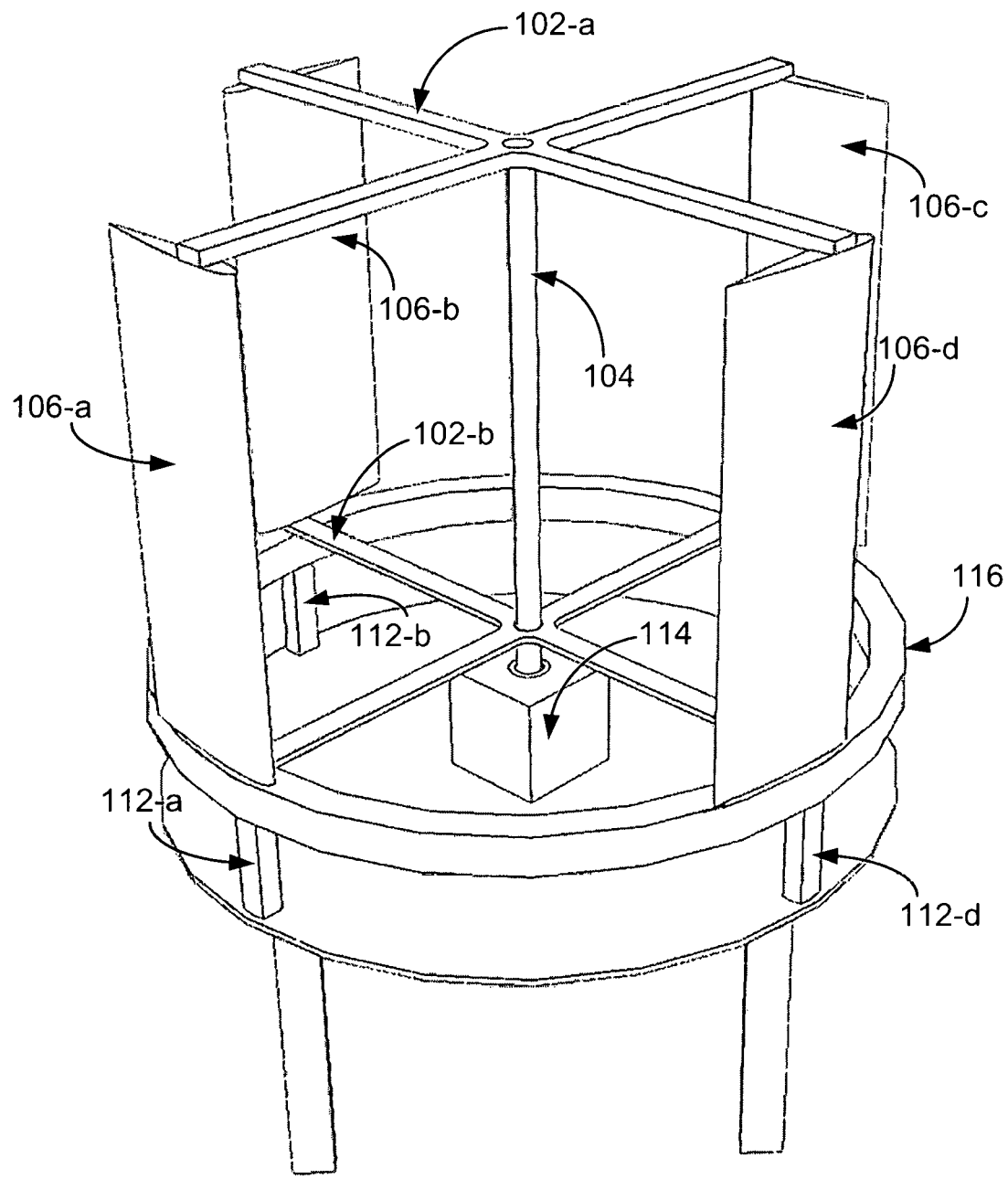
FIG. 1 depicts an exemplary schematic diagram of a wind turbine assembly in which the present apparatuses and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The apparatuses and methods described herein relate to stabilizing a wind turbine assembly. More specifically, the apparatuses and methods described herein relate to stabilizing a wind turbine using vane bearings. A vertical axis wind turbine generally consists of one or more vanes and supporting structures mounted on a shaft. One or more bearings may be positioned at the top and/or bottom of the shaft. Because the wind turbine is subject to large forces from the wind the bearings have to be far enough apart to handle the large torque resulting from the wind forces. When the wind turbine is operating at high RPM centrifugal forces acting on small imbalances can cause the wind turbine to move from side to side at the top of the wind turbine in a wobbling oscillation that can result in the destruction of the wind turbine if preventive measures are not taken. There are advantages to operating the wind turbine at high RPM, but the oscillation instability limits the RPM to avoid damage to the wind turbine.

There is also an advantage to increasing the radius of a vertical axis wind turbine by increasing the distance between the wind turbine vanes and increasing the distance between the vanes and the shaft to decrease the effect the turbulence of one vane will have on another. Increasing the radius of the wind turbine spaces the vanes further apart, but increasing the diameter of the wind turbine decreases the speed at which oscillation instability will develop and the prerequisite lower operating RPM offsets the advantages of increasing the diameter of the wind turbine.

A sustained and/or increasing amplitude of oscillation among the pieces of the wind turbine assembly may result in destruction of the wind turbine assembly. As a result, benefits may be realized by an apparatus and method for eliminating oscillation instability of a wind turbine assembly.

In one embodiment, a vertical-axis wind turbine may include vane bearings positioned out over and/or under the vanes of the wind turbine. The vane bearings may include any combination of bearings, including ball bearings, roller bearings, ball thrust bearings, hydrostatic bearings, roller thrust bearings, spherical roller thrust bearings, cylindrical roller thrust bearings, needle roller thrust bearings, ceramic thrust bearings, fluid-film thrust bearings, tapered roller bearings, and the like. In some cases, positioning the vane bearing out over/under the vanes may include positioning the bearings directly above/under the circular path of vanes while the wind turbine is spinning. Additionally, or alternatively, positioning the vane bearing out over/under the vanes may include positioning the vane bearings within a predetermined distance beyond and/or within the vane's circular path. As one example, the bearings may be positioned up to 25% of the distance of the vane radius from the vane's circular path. For example, given a radius of 100 inches, the bearings may be positioned within 25 inches of the vane's circular path (e.g., beyond, within, and/or directly under/over the vane's circular path). For example, in some cases, the bearing assembly may extend beyond the rotational path of the vanes, providing increased load bearing capabilities to the wind turbine due to the rotational forces.

Reconfiguring a wind turbine so the bearings are positioned out over and/or under or at least within a predetermined distance of the vanes allows the vane radius from the center of a wind turbine to the vanes to be increased without increasing instability. With standard wind turbines, the larger the radius the more unstable the wind turbine becomes. There are advantages, however, to increasing the radius. Increasing the radius increases the wind speed multiple for a given revolution per minute (RPM) of the wind turbine. In turn, increasing the wind speed multiple increases the power generated for that given RPM. Increasing the radius also increases wind turbine efficiency over a greater range of wind speeds. For example, given a wind turbine operating at a wind speed multiple of 4 (4 times the speed of the wind) with a wind speed of 5 meters per second (m/s) at 180 RPM, the wind speed multiple drops to 2 when the wind speed picks up to 10 m/s while maintaining the same 180 RPM. However, if the radius of the wind turbine is increased so that the wind turbine is operating at a wind speed multiple of say 8 at a given RPM, then a doubling of the wind speed only drops the wind speed multiple down to 4, a wind speed multiple that still enables the wind turbine to increase the RPM up to a rotational speed that produces a maximum efficiency. The wind speed multiple may also be referred to as a tip speed ratio, or the ratio at which a tip of a vane or airfoil rotates relative to the speed of the wind. If the tip of an airfoil rotates at three times the speed of the wind, then the wind turbine may be said to have a tip speed ratio or wind speed multiple of 3.

The standard wind turbine includes a relatively long vertical shaft in the center of the wind turbine with bearings on each end of this center shaft. The bearings are positioned on the vertical shaft to counteract the torque created by operating the wind turbine, the greater the vane radius the greater the load on the center shaft bearings. In some embodiments, reconfiguring the bearings to be positioned out over and/or under the vanes may counteract the increased torque created by increasing the vane radius without the debilitating instability of standard wind turbines in part due to the increase stress on the center shaft bearings, in one embodiment, increasing the radius of a wind turbine and reconfiguring the bearings to be positioned out over and/or under the vanes may enable the overall height of the wind turbine to be reduced by shortening the wind turbine's vertical shaft. Thus, increasing the radius of the wind turbine via the vane bearings being positioned out over and/or under the vanes may drastically shorten the wind turbine's vertical shaft.

In some embodiments, the increased radius of the wind turbine allowed by reconfiguring the vane bearings to be positioned out over and/or under the vanes allows the vanes to have a greater separation/space from each other, which allows more undisturbed air to flow through the wind turbine, enabling the back side of the wind turbine (i.e., the side of the wind turbine that is opposite the side of the incident wind) to generate additional power, which in turn increases both the overall power and efficiency of the wind turbine.

FIG. 1 depicts an exemplary schematic diagram of a wind turbine assembly 100 in which the present apparatuses and methods may be implemented. As indicated, the wind turbine assembly 100 may include a vertical axis wind turbine. As depicted, the wind turbine assembly 100 may include support arms 102-*a* and 102-*b*, turbine shaft 104, vanes 106-*a*, 106-*b*, 106-*c*, and 106-*d*, support posts 112, motor 114, and bearing assembly 116.

In one embodiment, wind incident on vanes 106 may be converted to mechanical power via turbine shaft 104. Wind turbine assembly 100 may include a motor 114. Motor 114 may include an electrical motor, a generator, an alternator, and the like. Thus, in some embodiments the mechanical power generated by spinning turbine shaft 104 may be converted to electrical power via motor 114.

One or more vanes 106 may be configured in the shape of an airfoil. The vane support structure of wind turbine assembly 100 may include one or more support structures such as support arm 102-*a* and/or support arm 102-*b*. In some embodiments, support arm 102-*a* and/or support arm 102-*b* may be connected to the turbine shaft 104. In some embodiments, wind turbine assembly 100 may include vane shafts. In some embodiments, vanes 106 may include a vane shaft that runs vertically from support arm 102-*a* to support arm 102-*b*. In some cases, the vane shaft may be located at the quarter chord point of vanes 106. Vane shafts may be configured to enable vanes 106 to rotate freely on the vane shafts. In one embodiment, vane shafts may include a shaft that runs from the top of each vane 106 at the support arm 102-*a* to the bottom of each vane 106 at support arm 102-*b*. In some embodiments, wind turbine assembly 100 may include one or more vane stops to limit the degree of rotation of each vane 106 allowed around the vane shafts. Vane stops may be attached to support structure 102-*a* and/or 102-*b* to prevent a complete rotation of the vanes 106 about the vane shaft. Preventing the complete rotation of vanes 106 may enable self-starting. Self-starting may include turbine shaft 104 rotating without any other external input other than the wind incident on vanes 106.

In some embodiments, as illustrated the wind turbine assembly 100 may be configured to spin counter-clockwise. In some embodiments, the wind turbine assembly 100 may be configured to spin clockwise. As depicted, each vane 106 may be configured in an airfoil shape. Thus, each vane 106 may include a leading edge, a trailing edge, an inner surface (e.g., side shown for vanes 106-*b* and 106-*c*), and an outer surface (e.g., side shown for vanes 106-*a* and 106-*d*).

In some embodiments, bearing assembly 116 may include a set of bearings such as ball bearings, roller bearings, ball thrust bearings, roller thrust bearings, tapered roller bearings, and the like. As depicted, bearing assembly 116 may be positioned in relation to the circular path of vanes 106. For example, bearing assembly 116 may be positioned to be directly under vanes 106. Additionally, or alternatively, bearing assembly 116 may be positioned to be directly above vanes 106. In some embodiments, bearing assembly 116 may be positioned within a predetermined distance of the vane radius such as within the predetermined distance beyond the vane radius and/or within the predetermined distance inside the vane radius.

Although depicted with support arms 102 under vanes 106 and above bearing assembly 116, in some embodiments support arms 102 may be positioned under both vanes 106 and bearing assembly 116. Thus, instead of the top of bearing assembly 116 rotating with vanes 106, in some embodiments the bottom of bearing assembly 116 may rotate with varies 106 when support arms 102 are attached to the bottom of bearing assembly 116. In some embodiments, support arms 102 may be attached to the bottom and top of bearing assembly 116. In some cases, wind turbine 100 may include upper and lower bearing assembly attached to each other. For example, bearing assembly 116 may be an upper bearing assembly and a lower bearing assembly may be located directly below bearing assembly 116. Support arms 102 may attach to the top of the upper bearing assembly as depicted, and an additional set of support arms may attach to the bottom of the lower assembly. In some cases, support posts 112 may be positioned inside and/or outside the rotational path of vane 106, allowing the lower and upper bearing assemblies to rotate unobstructed by support posts 112.

Figure 2:
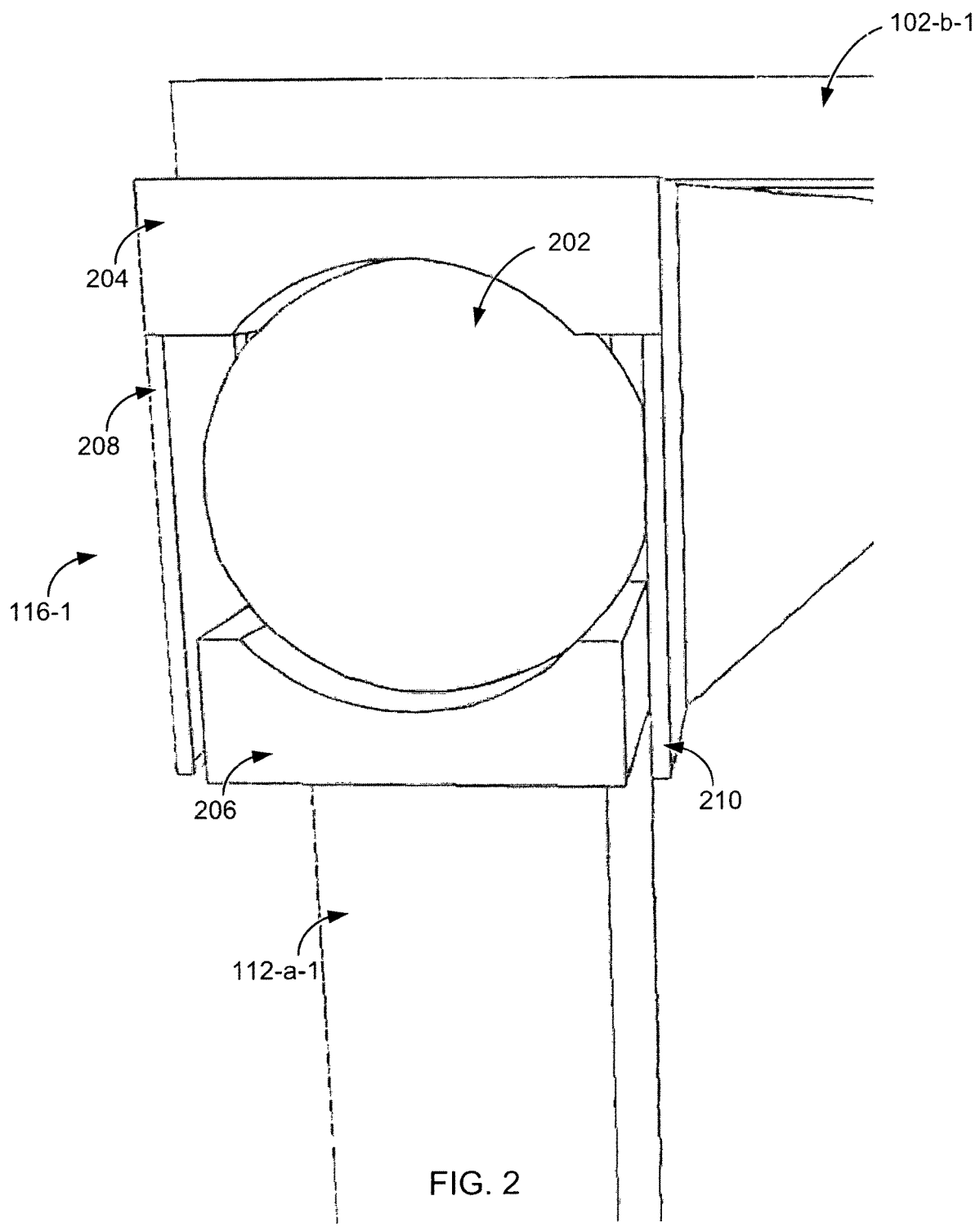
FIG. 2 depicts another exemplary schematic diagram of a bearing assembly.

FIG. 2 depicts exemplary schematic diagram of bearing assembly 116-1. Bearing assembly 116-1 may be one example of bearing assembly 116 of wind turbine assembly 100 depicted in FIG. 1. As depicted, bearing assembly 116-*a* may include a ball bearing 202, upper race 204, lower race 206, outer sidewall 208, and inner sidewall 210. In some cases, bearing assembly 116-1 may attach to support arm 102-*b*-1. Support arm 102-*b*-1 and support post 112-*a*-1 may be examples of support arm 102-*b* and support posts 112, respectively, of FIG. 1. Accordingly, bearing assembly 116-1 may include one or more ball bearings such as depicted ball bearing 202, guided by upper race 204 and lower race 206, and configured to support the rotational forces of a spinning wind turbine assembly such as wind turbine assembly 100 of FIG. 1. As depicted, support arm 102-*b*-1 may attach to upper race 204. Thus, in some embodiments, when vanes cause support arm 102-*b*-1 to rotate, upper race 204 may rotate with support arm 102-*b*-1 while lower race 206 remains fixed in place with post 112-*a*-1. In some embodiments, bearing assembly 116-1 may be part of an upper bearing assembly. A lower bearing assembly, similar to bearing assembly 116-1, may be positioned below bearing assembly 116-1. With a lower bearing assembly and/or dual lower and upper bearing assemblies, support arm 112-*a*-1 may be attached to outer sidewall 208, an additional support arms may attach to the lower race of the lower bearing assembly. Thus, an upper support arm may attach to the upper race of the upper bearing assembly, a lower support arm may attach to the lower race of the lower bearing assembly, and when the vanes of the wind turbine rotate, the upper race of the upper bearing assembly and the lower race of the lower bearing assembly may rotate with the vanes, while the lower race of the upper bearing assembly and upper race of the lower bearing assembly remain fixed in relation to the support posts 112. In some cases, the upper and lower races may be free to rotate on the upper and/or the lower bearing assemblies, the lower race of the upper bearing assembly being attached to a track of the upper bearing assembly that allows the lower race of the upper bearing assembly to rotate freely and/or the upper race of the lower bearing assembly being attached to a track of the upper bearing assembly that allows the upper race of the lower bearing assembly to rotate freely.

Although depicted with support arms 102 under vanes 106 and above bearing assembly 116, in some embodiments support arms 102 may be positioned under both vanes 106 and bearing assembly 116. Thus, instead of the top of bearing assembly 116 rotating with vanes 106, in some embodiments the bottom of bearing assembly 116 may rotate with vanes 106 when support arms 102 are attached to the bottom of bearing assembly 116. In some embodiments, support arms 102 may be attached to the bottom and top of bearing assembly 116. In some cases, wind turbine 100 may include upper and lower bearing assembly attached to each other. For example, bearing assembly 116 may be an upper bearing assembly and a lower bearing assembly may be located directly below bearing assembly 116. Support arms 102 may attach to the top of the upper bearing assembly as depicted, and an additional set of support arms may attach to the bottom of the lower assembly. In some cases, support posts 112 may be positioned inside and/or outside the rotational path of vane 106, allowing the lower and upper bearing assemblies to rotate unobstructed by support posts 112.

Figure 3:
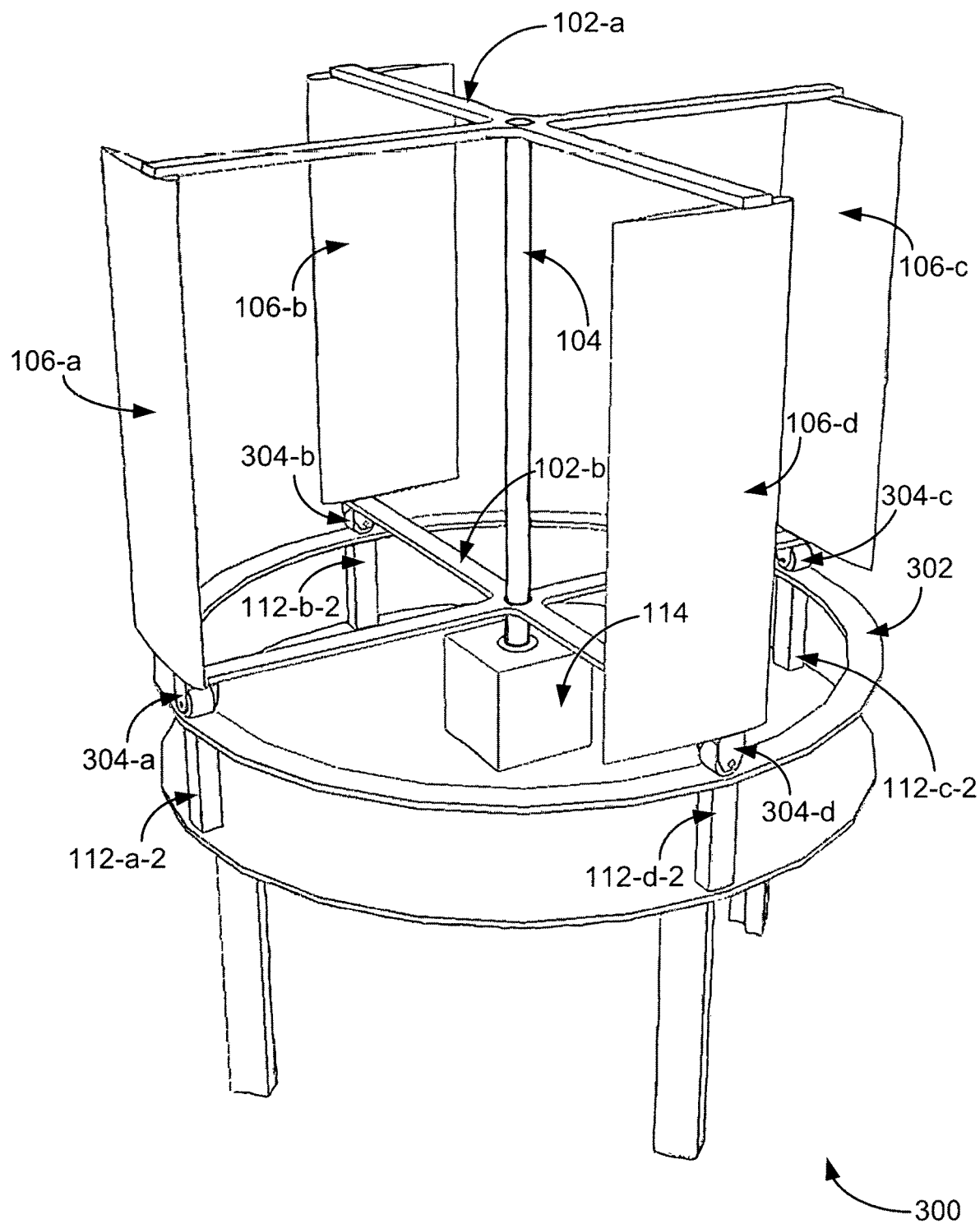
FIG. 3 depicts another exemplary schematic diagram of a wind turbine assembly.

FIG. 3 depicts another exemplary schematic diagram of a wind turbine assembly 300 in which the present apparatuses and methods may be implemented. The wind turbine assembly 300 may be one example of the wind turbine assembly 100 depicted in FIGS. 1 and/or 2. In some embodiments, the wind turbine assembly 300 may include support arms 102-*a* and 102-*b*, turbine shaft 104, vanes 106-*a*, 106-*b*, 106-*c*, and 106-*d*, support posts 112, motor 114, bearing track 302, and roller bearings 304. As illustrated, each vane 106 may include a roller bearing 304, e.g., vane 106-*a* may include roller bearing 304-*a*, vane 106-*b* may include roller bearing 304-*b*, etc. In some embodiments, each vane 106 may include a vane shaft that runs vertically just as turbine shaft 104. Each vane shaft may run from support structure 102-*a* to support structure 102-*b* through vanes 106. In some embodiments, the vane shafts may be positioned to run vertically at the quarter chord point of vanes 106. In some embodiments, roller bearings 304-*b* may attach to at least one of support structure 102-*b*, vanes 106, and relative vane shafts. For example, roller bearing 304-*a* may attach to support structure 102-*b*, vane 106-*a*, and/or a vane shaft running vertically through vane 106-*a*. The roller bearings 304 may run along the bearing track 302, the bearing track 302 positioned circumferentially in relation to the rotational path of the vanes 106. In some embodiments, roller bearings 304 may stabilize wind turbine assembly 300 while the vanes 106 rotate as a result of wind incident on wind turbine assembly 300. Thus, instead of placing bearings on turbine shaft 104, roller bearings 304 may be positioned relative to vanes 106 to bear the forces introduced by rotation of wind turbine assembly 300.

In some embodiments, roller bearing 304 may be positioned above and/or below bearing track 302. Although depicted with roller bearings 304 on top of bearing track 302, in some embodiments, roller bearings 304 may be positioned below bearing track 302. For example, support posts 112 may be positioned inside and/or outside the rotational path of vane 106, allowing roller bearings 304 to rotate below track 302 unobstructed by support posts 112. Thus, in some cases, wind turbine assembly 300 may include roller bearings 304 above and below bearing track 302.

Figure 4:
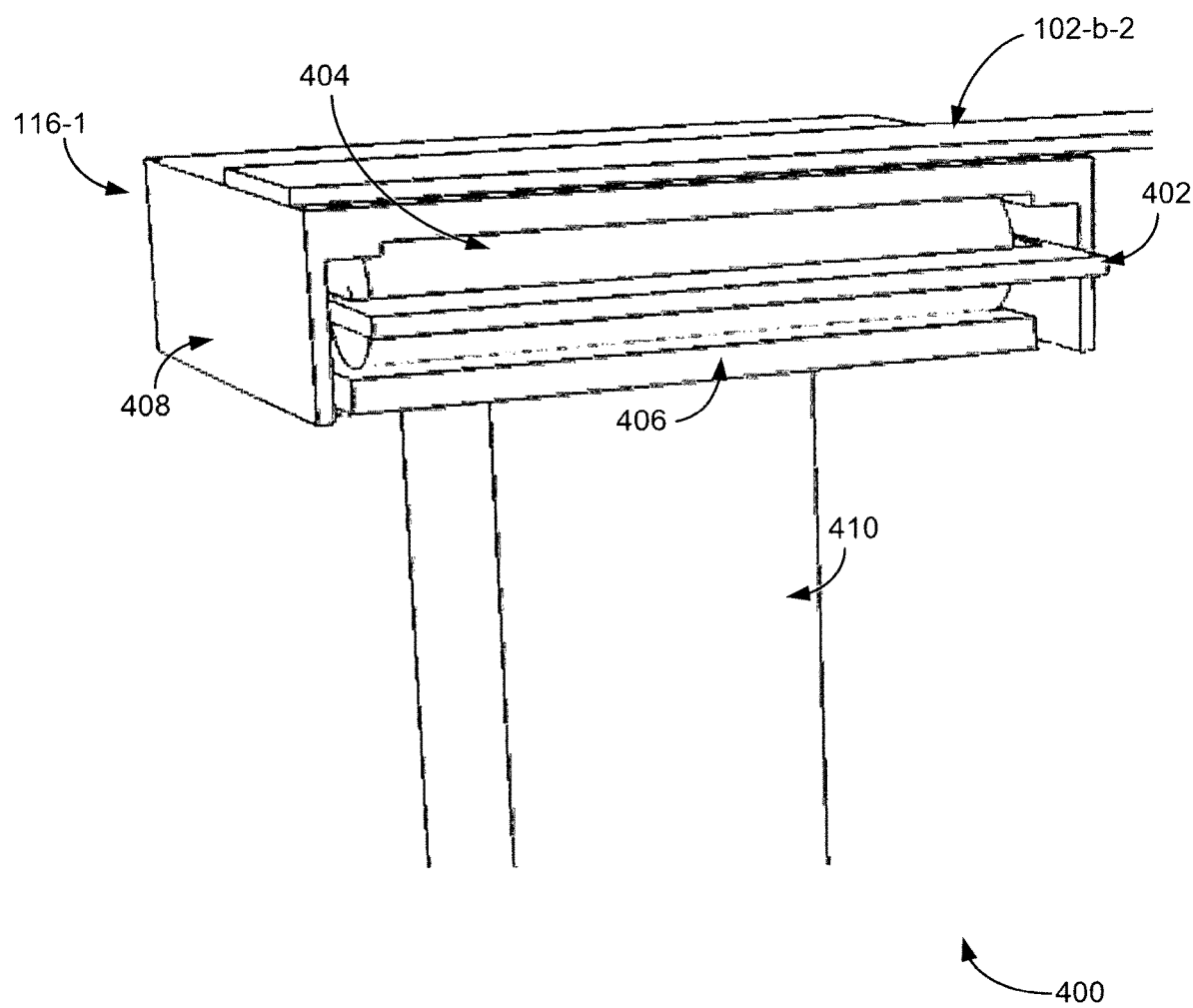
FIG. 4 depicts a cross section of another embodiment of a bearing assembly.

FIG. 4 depicts a cross section 400 of a cross section of bearing assembly 116-1. The cross section 400 may include support structure 102-*b*-2 and bearing assembly 116-1, either of which may be examples of support structures 102 and bearing assembly 116 of FIGS. 1, 2, and/or 3. The bearing assembly 116-1 may include roller plate 402, roller bearing 404, fixed raceway 406, revolving raceway 408, and support post 410. Bearing assembly 116-1 may extend circularly under and/or above vanes of a wind turbine assembly such as bearing assembly 116 of FIG. 1. The fixed raceway 406 may be connected to support post 410, fixing the raceway 406 in place as the wind turbine rotates with incident wind. Revolving raceway 408 may be attached to support structure 102-*b*-2, and support structure 102-*b*-2 may be attached to turbine shaft and one or more vanes. Thus, as the one or more vanes rotate due to incident wind, revolving raceway may rotate around turbine shaft on roller bearings (e.g., roller bearing 404), rotating with the support structure 102-*b*-2 and the one or more vanes. Accordingly, bearing assembly 116-1 may stabilize a wind turbine assembly via roller plate 402, roller bearing 404, and raceway 406 while the wind turbine assembly rotates due to incident wind.

Figure 5:
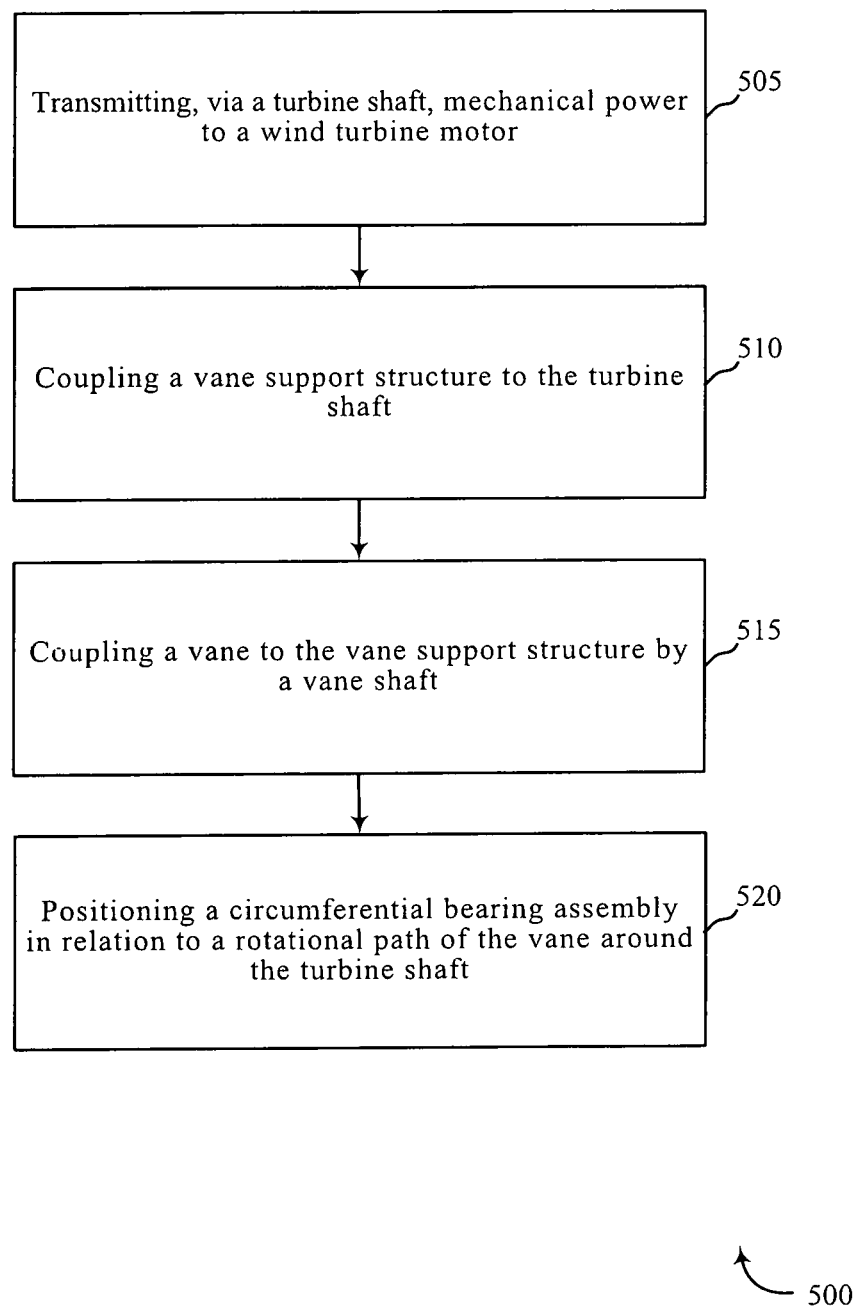
FIG. 5 is a flow diagram illustrating one embodiment of a method for stabilizing a wind turbine assembly.

FIG. 5 is a flow diagram illustrating one embodiment of a method 500 for stabilizing a wind turbine assembly. In some configurations, the method 500 may be implemented relative to the bearing assemblies of FIGS. 1, 2, 3, and/or 4.

At block 505, the method 500 may include transmitting, via a turbine shaft, mechanical power to a wind turbine motor. At block 510, the method 500 may include coupling a vane support structure to the turbine shaft. At block 515, the method 500 may include coupling a vane to the vane support structure by a vane shaft. At block 520, the method 500 may include positioning a circumferential bearing assembly in relation to a rotational path of the vane around the turbine shaft.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, assembly, structural (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present apparatuses and methods and their practical applications, to thereby enable others skilled in the art to best utilize the present apparatuses and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A wind turbine assembly comprising:
   a turbine shaft positioned at a center of the wind turbine assembly and configured to rotate a wind turbine motor;
   a vane support arm coupled to the turbine shaft;
   a vane coupled to the vane support arm by a vane shaft, wherein the vane shaft is parallel to the turbine shaft; and
   a circumferential bearing assembly positioned under the vane and along a rotational path of the vane around the turbine shaft, wherein the circumferential bearing assembly includes a bearing track and a rolling element selected from the group consisting of at least one of a ball bearing, a roller bearing, a thrust bearing, a hydrostatic bearing, a roller thrust bearing, a spherical roller thrust bearing, a cylindrical roller thrust bearing, a needle roller thrust bearing, a ceramic thrust bearing, a fluid-film thrust bearing, a tapered roller bearing and any combination thereof, wherein the rolling element is configured to roll along the bearing track and the bearing track is fixed in place relative to the rolling element, wherein the circumferential bearing assembly comprises a fixed raceway connected to a plurality of support rods underneath the circumferential bearing assembly.

2. The wind turbine assembly of claim 1, wherein the bearing track is positioned circumferentially in relation to the rotational path of the vane.

3. The wind turbine assembly of claim 2, wherein the rolling element is connected to at least one of the vane shaft, the vane support arm, and the vane, the rolling element being configured to roll under the vane and along the bearing track.

4. The wind turbine assembly of claim 1, wherein the circumferential bearing assembly further comprises a roller plate and a revolving raceway, the roller plate and raceways positioned circumferentially in relation to the rotational path of the vane.

5. The wind turbine assembly of claim 4, wherein the revolving raceway rotates on top of the roller bearing around the turbine shaft in formation with a rotation of the vane due to a wind incident on the wind turbine assembly, the revolving raceway being connected to the vane support arm.

6. The wind turbine assembly of claim 5, wherein the fixed raceway remains fixed with the rotation of the vane due to the wind incident on the wind turbine assembly.

7. The wind turbine assembly of claim 1, wherein a first radius measures from the turbine shaft to the circumferential bearing assembly and a second radius measures from the turbine shaft to the rotational path of the vane around the turbine shaft, wherein the first radius is between 75% and 125% of the second radius.

8. A method for stabilizing a wind turbine assembly, the method comprising:

transmitting, via a turbine shaft, mechanical power to a wind turbine motor, the turbine shaft positioned at a center of the wind turbine assembly;

coupling a vane support arm to the turbine shaft; coupling a vane to the vane support arm by a vane shaft, wherein the vane shaft is parallel to the turbine shaft; and positioning a circumferential bearing assembly under the vane and along a rotational path of the vane around the turbine shaft, wherein the circumferential bearing assembly includes a bearing track and a rolling element selected from the group consisting of at least one of a ball bearing, a roller bearing, a thrust bearing, a hydrostatic bearing, a roller thrust bearing, a spherical roller thrust bearing, a cylindrical roller thrust bearing, a needle roller thrust bearing, a ceramic thrust bearing, a fluid-film thrust bearing, a tapered roller bearing and any combination thereof, wherein the rolling element is configured to roll along the bearing track and the bearing track is fixed in place relative to the rolling element, wherein the circumferential bearing assembly comprises a fixed raceway connected to a plurality of support rods underneath the circumferential bearing assembly.

9. The wind turbine assembly of claim 1, wherein the circumferential bearing assembly includes a circumferential upper race, a circumferential lower race.

10. The wind turbine assembly of claim 9, wherein the vane support arm attaches to the circumferential upper race.

* * * * *